Oct. 9, 1945.　　　K. H. HACHMUTH　　　2,386,310
BUTADIENE PRODUCTION
Filed March 31, 1943　　　2 Sheets-Sheet 1
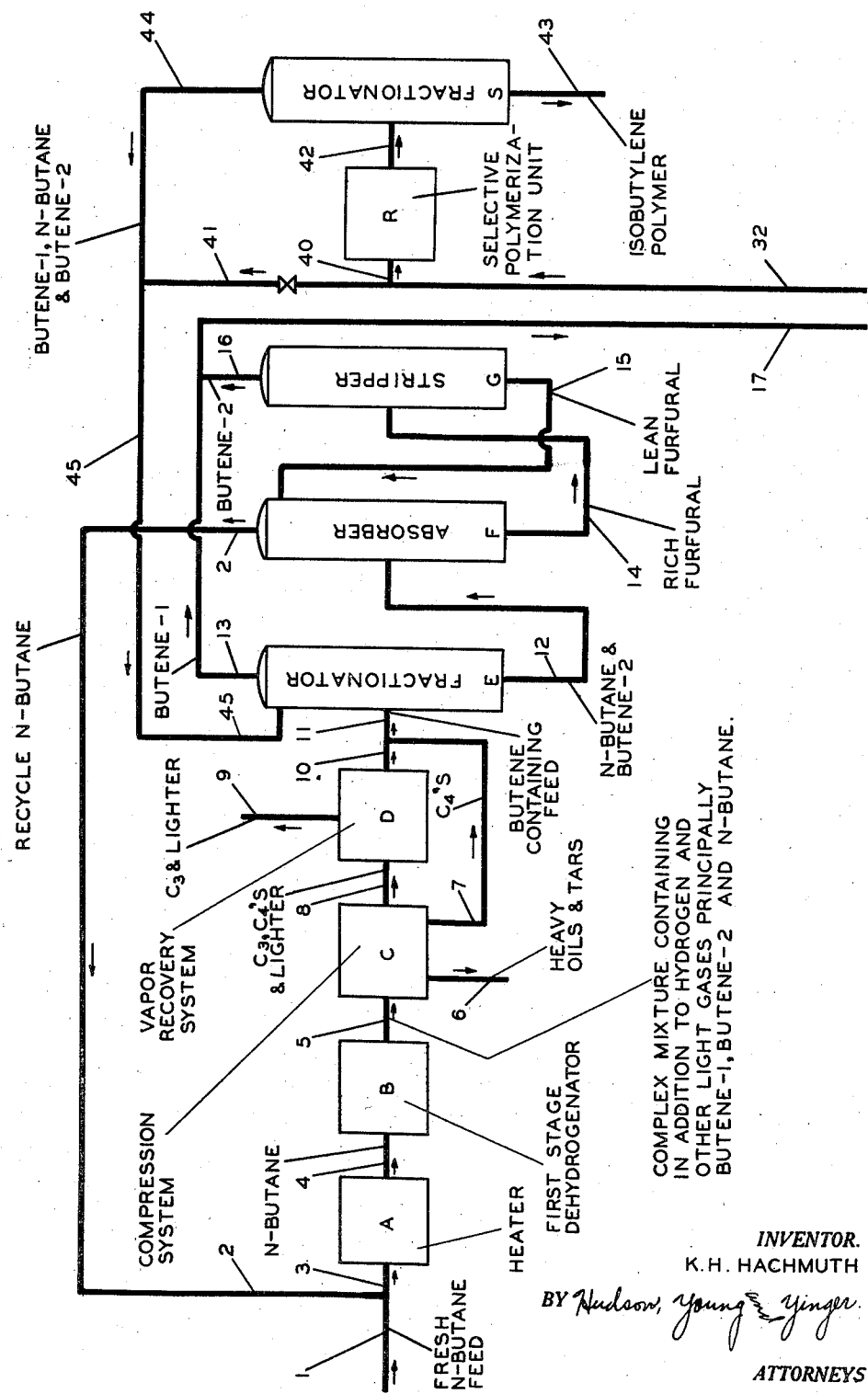
INVENTOR.
K. H. HACHMUTH
BY Hudson, Young & Yinger
ATTORNEYS.

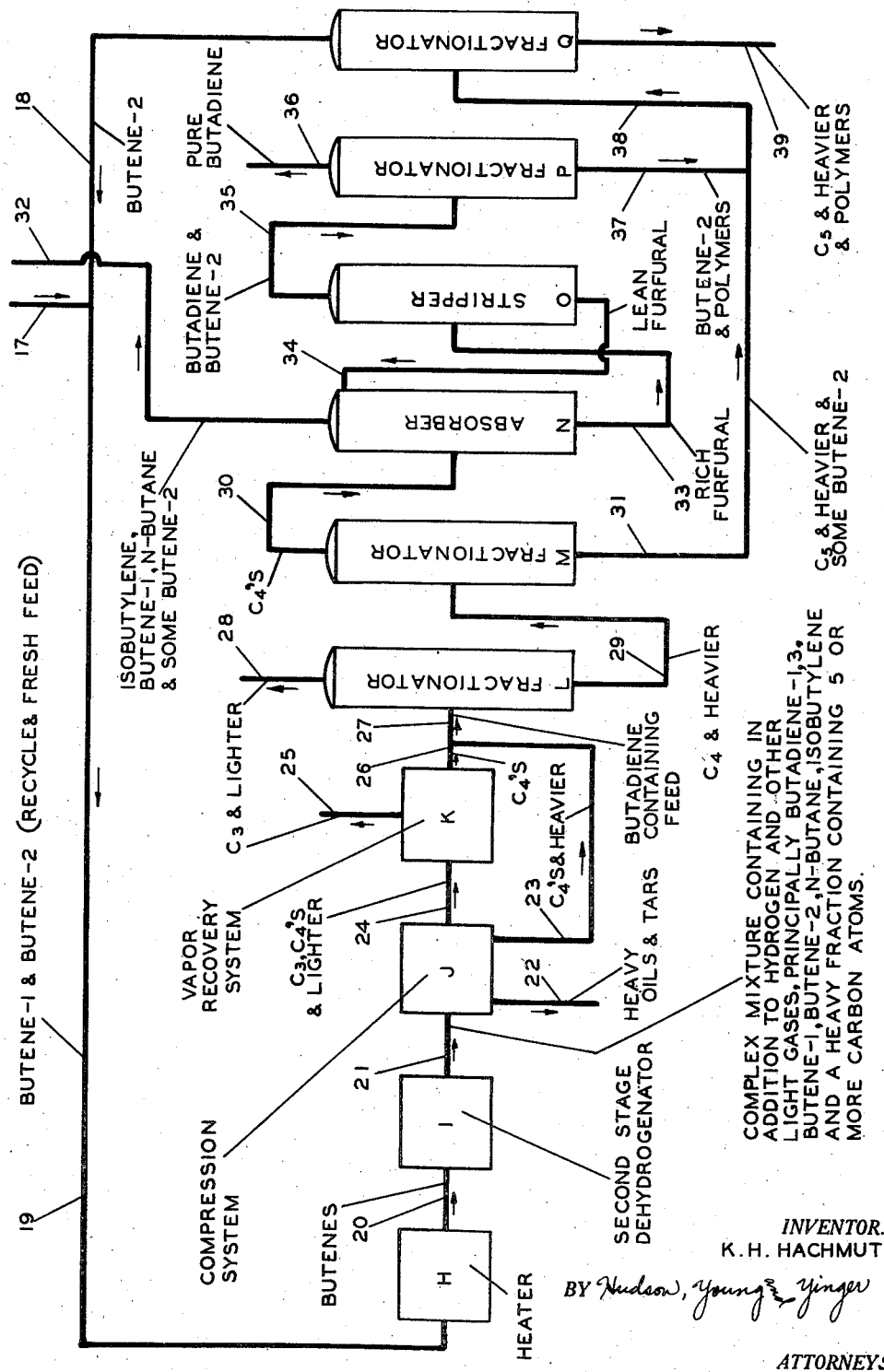

Patented Oct. 9, 1945

2,386,310

UNITED STATES PATENT OFFICE 2,386,310

BUTADIENE PRODUCTION

Karl H. Hachmuth, Bartlesville, Okla., assignor to Phillips Petroleum Company, a corporation of Delaware Application March 31, 1943, Serial No. 481,305

11 Claims. (Cl. 260—680)

This invention relates to methods for separating and recovering individual $C_4$ hydrocarbons from complex hydrocarbon mixtures comprising both normally gaseous and normally liquid hydrocarbons of both saturated and unsaturated linkages in a butadiene manufacturing process. More specifically, this invention relates to the separation and recovery, in suitable purity and concentration, of certain individual $C_4$ hydrocarbons in a process for the manufacture of high purity butadiene by a two stage catalytic dehydrogenation of normal butane, the first stage comprising the catalytic dehydrogenation of n-butane to butenes with the $C_4$ portion of the dehydrogenator product consisting principally of butene-1, butenes-2 (both high and low boiling) and n-butane, and the second stage comprising the catalytic dehydrogenation of said butene-1 and butenes-2 to butadiene with the $C_4$ portion of the dehydrogenator product consisting principally of butadiene-1,3, butene-1, isobutylene, n-butane and butenes-2 (both low and high boiling). This invention further relates to a process wherein the butene-1, n-butane and butenes-2 in the product from the first stage dehydrogenator are recovered separately by removing butene-1 from n-butane and butenes-2 in a conventional fractionator and then subjecting the n-butane-butenes-2 mixture to a selective solvent absorption unit wherein said n-butane and butenes-2 are recovered as separate products. The butene-1 from the fractionator and the butenes-2 from the solvent unit are then recombined and charged to the second stage dehydrogenator. Moreover, this invention relates to a process wherein the fractionator employed to separate the butene-1 from the n-butane and butenes-2 in the product from the first stage dehydrogenator also serves to separate the butene-1 from n-butane and butenes-2 in the product from the second stage dehydrogenator. In addition, this invention relates to a process wherein the isobutylene in the product from the second stage dehydrogenator (or from the first stage dehydrogenator, also, if isobutane is present in the n-butane feed stock) is separated and recovered from the other $C_4$ hydrocarbons by means of a catalytic selective polymerization unit wherein the isobutylene is polymerized to di-isobutylene, a valuable base stock for aviation fuel.

The principal object of the invention is to provide a highly improved process of making butadiene from normal butane. The object of my invention, in the instance of the first stage dehydrogenation, is to separate butene-1 and butenes-2 from the unconverted n-butane in suitable purity and concentration for charge stock to the second stage dehydrogenator and at the same time recover the unconverted n-butane in suitable purity and concentration for further processing as recycle stock to the first stage dehydrogenator. In the instance of the second stage dehydrogenator, the object of my invention is to separate and recover the butadiene from the unconverted butenes in suitable concentration and purity for use in synthetic rubber processing and to recover the unconverted butene-1 and butenes-2 in suitable concentration and purity for recycle stock to the second stage dehydrogenator. Another object of my invention is to perform the above described operations in the most efficient and economical manner. A great many other objects will hereinafter appear.

One advantage of my invention, which will become apparent in the light of further disclosure, is the recovery of the butene-1, n-butane and butenes-2 in the first stage dehydrogenator product as individual and separate hydrocarbons. Another advantage of my invention is that the recovery and separation steps in my process are so arranged that a single fractionator serves to separate butene-1 and n-butane from the other $C_4$ hydrocarbons present in the reaction products from both stages of dehydrogenation. Still another advantage of my invention is the use of a catalytic polymerization unit to selectively polymerize and remove isobutylene from the other paraffinic and olefinic $C_4$ hydrocarbons present in the system. The use of a selective polymerization catalyst to polymerize isobutylene to di-isobutylene (which is easily separated from $C_4$ hydrocarbons by distillation) not only affords an easy means of separating isobutylene but also converts it to a valuable ingredient of aviation fuel.

For reference purposes, the boiling points of the $C_3$ and $C_4$ hydrocarbons apt to be present in the products from the dehydrogenators are tabulated below.

| Hydrocarbon | Normal boiling point | |
|---|---|---|
| | °C. | °F. |
| Propylene | −47.6 | −53.7 |
| Propane | −42.1 | −43.8 |
| Methyl acetylene | −23.1 | −9.6 |
| Isobutane | −11.8 | +10.8 |
| Isobutylene | −7.1 | 19.2 |
| Butene-1 | −6.3 | 20.7 |
| Butadiene-1, 3 | −4.5 | 23.9 |
| N-butane | −0.5 | 31.1 |
| Butene-2 (trans) | +0.9 | 33.6 |
| Butene-2 (cis) | 3.6 | 38.5 |
| Vinyl acetylene | 5.1 | 41.2 |
| Ethyl acetylene | 8.8 | 47.8 |
| Butadiyne-1, 3 (biacetylene) | 9.8 | 49.6 |
| Butadiene-1, 2 | 10.3 | 50.5 |
| Dimethyl acetylene | 27.2 | 81.0 |

In addition to the above tabulated hydrocarbons and hydrogen, other hydrocarbons present in greater or lesser amounts in the dehydrogenator products are methane, ethylene, ethane and a heavy fraction of 5 and more carbon atoms.

The accompanying drawings schematically illustrate my invention and shows the distribution of the principal hydrocarbons.

In the drawings, essentially pure normal butane from an outside source, not shown, enters the system through line 1, combines with recycle stock butane in line 2 and enters heater A through line 3. In heater A the n-butane is raised to reaction temperature and is then passed to dehydrogenator B through line 4. In dehydrogenator B a portion of the n-butane feed approximately equivalent to the quantity entering in line 1 is catalytically dehydrogenated and the products of reaction are passed to a compression system C through line 5. The reaction products consist principally of hydrogen, butene-1, butenes-2 (both low and high boiling) and normal butane. Small quantities of light gases other than hydrogen (namely, methane, ethylene, ethane, propylene and propane) are also formed in the reaction. Also, small quantities of isobutane, isobutylene and butadiene appear in the dehydrogenator effluent stream. The quantity of hydrocarbons containing 5 or more carbon atoms is extremely small.

After cooling the dehydrogenator effluent gases to about atmospheric temperature, the gases are compressed to a suitable pressure in compression system C. Suitable scrubbing and cooling of the gases between compression stages are carried out as required and most of the heavy hydrocarbons condense in the low pressure part of the equipment and are removed through line 6. After the final stage of compression, a large part of the butane and butylenes condense upon cooling and collect in an accumulator separator (not shown); this liquid is withdrawn through line 7 and enters the feed line 11, to fractionator E.

The uncondensed vapors and gases from the final stage of compression are passed through line 8 to a conventional mineral seal oil vapor recovery unit D, where the C₄'s are recovered from the gases. The gases, consisting of propane and lighter, are removed through line 9 while the C₄'s are removed through line 10 and are combined with the C₄'s in line 7 to form the total feed to fractionator E which enters the fractionator through line 11.

The combined liquid in line 11 contains a greater or lesser amount of dissolved gases depending upon the composition of the dehydrogenator effluent stream and the operating conditions imposed on the compression and vapor recovery systems. However, to one skilled in the art, it is a comparatively simple matter to design the process steps in the compression and vapor recovery system such that the quantity of propane and lighter hydrocarbons contained in the combined liquid is sufficiently small not to interfere in the subsequent separation steps or second stage dehydrogenation.

The combined liquid in line 11 consists principally of a mixture of butene-1, n-butane, and butenes-2 (both low boiling and high boiling). The three butenes are present in roughly equal proportions. The volatility of these four hydrocarbons is in the order of their arrangement above and separation by fractional distillation into products of butene-1, n-butane and butenes-2 would require two steps; first, to remove butene-1 as an overhead product; second, to remove n-butane as an overhead product. I have found from experience as well as knowledge of the relative volatilities of the hydrocarbons in question that separation by fractional distillation between butene-1 and n-butane, although difficult, is practical. However, separation between n-butane and butenes-2, particularly the low boiling butene-2, by fractional distillation is practically impossible. At the same time I have found that separation between n-butane and butenes-2 by selective solvent absorption is relatively easy, while selective solvent separation between n-butane and butene-1 is comparatively difficult. Therefore, in my invention, the butene-1 is separated from the n-butane and butenes-2 by fractional distillation and the n-butane is then separated from the butenes-2 by selective solvent absorption.

The separation between butene-1 and n-butane is effected in a conventional fractionator E. The separation obtained is quite sharp, leaving but a small quantity of butene-1 in the bottom product withdrawn from the reboiler section of the fractionator through line 12 and a small quantity of n-butane in the butene-1 overhead product withdrawn from the fractionator through line 13. All the C₃ and lighter material pass overhead; also, the small quantity of isobutane present in the feed will go overhead. Most of the isobutylene and butadiene, which are present in small amounts in the feed, will go overhead.

If desired, fractionator E may be so operated that the C₃ and lighter material in the overhead product leaving via line 13 is only partially condensed in the overhead reflux condenser (means not shown); the non-condensed vapors may then be separated in the reflux accumulator (not shown) and returned to the vapor recovery system D to recover the butene-1 retained in the uncondensed gases. However, the small quantity of C₃ and lighter material present in the butene-1 overhead product in line 13, even if not partially separated, will not interfere in the secondary dehydrogenation step.

The separation between n-butane and butenes-2 is accomplished by liquid-vapor contacting of the hydrocarbon and a selective solvent in absorber F. This is a two section tower, the upper section of which acts as an absorber for butenes-2 using a relatively non-volatile solvent introduced at the top of the tower F through line 15. For the purpose of discussing my invention, furfural has been selected as an example from the group of various solvents available. Various other solvents that will meet the practical requirements for C₄ separations by selective solvent extraction are disclosed in my copending application, Serial No. 454,312, filed August 10, 1942. The bottom section of the tower F acts as a stripper to remove n-butane which is absorbed to some extent in the top section of the tower. The reboiling of the solvent at the bottom of the tower F furnishes the necessary vapors to carry out this stripping while returning part of the overhead product 2 as reflux (means not shown) to the top of the tower F serves to remove the heat added by the reboiler. Normal butane of desired purity is withdrawn from the top of the tower through line 2 and recycled to heater A while the furfural solvent containing the butenes-2 is withdrawn from the bottom of the tower through line 14.

The rich solvent leaving the bottom of absorber F is passed to a solvent stripping tower G, where the butenes-2 are removed as an overhead product through line 16 while the lean or denuded solvent is returned, after suitable heat exchange and cooling, to the top of absorber F through line 15. In order to avoid excessive temperatures on the reboiler of the stripping tower, water is introduced to this reboiler where it is vaporized and furnishes the necessary stripping vapor. The water going overhead with the butenes-2 product is condensed and returned to the reboiler (means not shown) and thereby being maintained in a short closed cycle.

The butene-1 and butenes-2 overhead products from fractionator E and stripper G and flowing in lines 13 and 16, respectively, are combined in line 17 and charged to the second stage dehydrogenation step by means of line 19.

The second stage dehydrogenation process is very similar to the first stage. The butenes formed and separated in the first stage are combined with recycle butenes in line 18 and are charged to heater H through line 19. In heater H the butenes are raised to reaction temperature and are then passed to dehydrogenator I through line 20.

In dehydogenator I a quantity of butenes approximately equal to the quantity of butenes formed in dehydrogenator B are catalytically dehydrogenated and the products of reaction are passed to a compression system, J, through line 21. The $C_4$ portion of the reaction products consists principally of isobutylene, butene-1, butadiene-1,3 n-butane and butenes-2 (both low and high boiling). The three butenes are present in roughly equal proportions. Hydrogen constitutes the greatest part of the light gases with methane, ethylene, ethane, propylene and propane constituting the remainder. Some isobutane as well as some methyl acetylene and $C_4$ acetylenes may also appear in the products of reaction. Somewhat more heavy hydrocarbons are formed than in the first stage dehydrogenation and must be removed before reaching the solvent extraction unit as explained hereinafter.

The arrangement of the equipment and the conditions used in the compression step and vapor recovery unit following the second stage dehydrogenator are similar to that described in connection with the first part of the process or first stage effluent treatment described above. Part of the heavy hydrocarbons, due to their low volatility, condense in the low pressure part of the compression system J, and are removed through line 22, while part of the $C_4$ and heavier are removed from a final stage of compression via line 23. The uncondensed gases and vapors from the final stage of compression are passed through line 24 to a vapor recovery system K where most of the $C_3$ and lighter components formed in the reaction are removed via line 25. This vapor recovery system may be substantially the same as or identical with unit D described above, using mineral seal oil. The $C_4$ hydrocarbons separated in unit K leave via line 26 and merge with the material flowing in line 23 into line 27. The roughly stabilized $C_4$ and heavier mixture resulting from the operations performed in the compression system and vapor recovery unit are charged to fractionator L, through line 27. The significant hydrocarbons involved in the separation of butadiene from the other hydrocarbons after most of the light gases have been removed are arranged below in order of descending volatility:

$C_3$'s
Methyl acetylene
Isobutane
Isobutylene
Butene-1
Butadiene-1,3
N-butane
Butene-2 (low boiling)
Butene-2 (high boiling)
$C_4$ acetylenes
$C_5$ and heavier The separation of the $C_4$ hydrocarbons from both lighter and heavier hydrocarbons and the separation of the $C_4$ hydrocarbons themselves (to obtain butadiene of high purity) from a mixture containing the hydrocarbons described above has been disclosed in my copending application, Serial No. 454,312, filed August 10, 1942. Specifically, this copending application discloses the separations effected in fractionators L and M, absorber N, stripper O and fractionator P. However, in order to describe the novel features of this invention, a brief description of the separations effected in vessels L, M, N, O, and P is repeated herein.

Since no rigorous separation between $C_3$'s and $C_4$'s has been made in any previous step, the $C_3$'s (along with a small quantity of $C_2$'s and methane) are present in appreciable concentration in the stabilized $C_4$ and heavier mixture charged to fractionator L through line 27. Although these $C_3$'s could be recycled to dehydrogenator I with no detrimental effect on the reaction, they would build to an appreciable recycle volume before the vapor recovery step would hold them constant. Therefore, to avoid building up a large recycle volume of $C_3$'s and also to remove any methyl acetylene that may be present (any methyl acetylene present will appear in the finished butadiene product from fractionator P if not removed at this point as explained in my co-pending application, Serial No. 454,312) and the $C_3$'s and lighter are separated from the $C_4$'s and heavier in fractionator L. The $C_3$'s and lighter, along with most of any methyl acetylene that may be present in the feed, are withdrawn as an overhead product from fractionator L through line 28.

The $C_4$ and heavier mixture withdrawn from the reboiler of fractionator L through line 29 is charged to fractionator M. In this fractionator most of the high boiling butene-2 as well as part of the low boiling butene-2 and $C_4$ acetylenes are removed as bottom product through line 31 while all the butadiene and more volatile hydrocarbons are removed as overhead product through line 30. Fractionator M also effects the removal of any light oils or polymers. These materials, if not removed, will accumulate in the solvent unit N and decrease the selectivity of the furfural and foul the heating surfaces. Removal of a portion of the butenes-2 at this point reduces the feed to the following furfural extraction step and also makes that operation easier since the butenes-2 tend to build an internal recycle within absorber N which separates butene-1 and butadiene.

The overhead product 30 from fractionator M is charged to absorber N wherein butene-1 is separated from butadiene through the use of furfural as the selective solvent. The separation is carried out to remove isobutylene overhead with the butene-1 while retaining the butadiene as a reboiler product. The butenes-2, which were not entirely removed in fractionator M, divide themselves between the overhead and bottoms product. N-butane, as well as isobutane if present, are removed with the isobutylene and butene-1 overhead product through line 32. If C₄ acetylenes are present in the feed to the absorber, these compounds will be absorbed in the furfural and will be removed with the butadiene and butenes-2 in the rich solvent leaving the bottom of the tower through line 33.

The rich furfural solvent leaving the bottom of absorber N is passed to a stripping tower, O, where the previously absorbed hydrocarbons are stripped from the furfural and passed to fractionator P through line 35. The denuded furfural is then returned to absorber N through line 34.

Essentially pure butadiene is removed overhead in fractionator P while the butenes-2 and the C₄ acetylenes, if present, are withdrawn as bottom product from the reboiler section of P through line 37. Traces of furfural solvent or polymers that are carried over from the solvent unit or polymers that are formed during the separation are also eliminated as a bottom product.

The butenes-2 bottom products (containing light oils formed in the dehydrogenation step and polymers formed in the separation steps) from fractionator M and fractionator P are joined together in line 38 and passed to fractionator Q wherein the butenes-2 are removed as overhead, from the oils and polymers as bottoms. It is desirable to remove these heavy hydrocarbons, before recycling the butenes-2, to prevent coking of the tubes in heater H and fouling of the catalyst in dehydrogenator I. Light oils and polymers are withdrawn from fractionator Q through line 39 while the butenes-2 overhead product is removed through line 18 whence it is combined with the butenes in stream 17 to form a butylene feed of satisfactory quality for the secondary dehydrogenation unit. If C₄ acetylenes are present in the feed to fractionator Q, these compounds will pass overhead and will ultimately be destroyed in dehydrogenator I.

Referring back to the overhead product from absorber N leaving via line 32, this stream contains principally isobutylene, butene-1, n-butane and some butenes-2. Part of the isobutylene in this stream was originally formed in the first stage dehydrogenator and was not entirely destroyed in passing through the second stage dehydrogenator; the remainder of the isobutylene was formed by the isomerization of the n-butenes in the second stage dehydrogenation step. Since the isobutylene is not readily destroyed in the dehydrogenation step, it will increase to a considerable concentration before reaching an equilibrium. To prevent this from building up to an undesirable concentration, the overhead product from absorber N is pumped through line 40 to a selective polymerization catalyst, R, where a substantial percentage, say about one-half, of the isobutylene is polymerized. The remaining isobutylene recycles to come back with an equal amount of new isobutylene formed in the dehydrogenation reactions. The effluent 42 from the polymerization step is debutanized in a conventional fractionating tower, S. The bottom product, withdrawn through line 43, is mainly di-isobutylene. The overhead product, removed through line 44 and passed to fractionator E, is n-butane, butene-1, butenes-2 plus the remaining isobutylene. Isobutane, if present in absorber N overhead product, passes through the polymerization catalyst, goes overhead in fractionator S, overhead in fractionator E, and is ultimately destroyed in the second stage dehydrogenator.

A by-pass line, 41, is provided around the selective polymerization unit so that, if desirable, only part of absorber N overhead product need be charged to the polymerization unit. The quantity of stream 32 charged to the polymerization unit through line 40 and the quantity of stream 32 allowed to by-pass the polymerization unit through line 41 is controlled by economic considerations and by the concentration of isobutylene that can be tolerated in the feed to the second stage dehydrogenation step without affecting that reaction adversely. (The greater the quantity of isobutylene by-passing the polymerization unit, the greater will be the recycle isobutylene concentration. Also, the greater the quantity of isobutylene by-passing the polymerization unit, the smaller will be the cost of operating the polymerization unit at the expense of increased costs on the equipment handling the isobutylene recycle.)

A preferred method of removal of isobutylene from part or all of stream 32 is by selective polymerization in accordance with methods known to the art and per se constituting no part of the present invention. It is preferred to use a known method of selective catalytic polymerization with silica-alumina catalyst. Instead however I may use other methods of selectively removing and/or polymerizing the isobutylene. For example I may wash the isobutylene-containing stream with dilute sulfuric acid of such concentration as to allow the normal butene content to remain unchanged. Or I may contact the stream with anhydrous hydrogen chloride to effect selective removal of the isobutylene without affecting normal butenes. Or I may employ mercury (especially mercuric) salts which selectively react with isobutylene in preference to the other butenes. Any other mode of selective removal of the isobutylene content may be employed without departing from the spirit of my invention.

Under conditions of operation of the second stage dehydrogenator, a small quantity of n-butane is formed by rehydrogenation of the butenes. Also, n-butane enters in the feed from the first part of the process due to incomplete purification of butenes. If this n-butane is recycled to the second stage dehydrogenation step it builds to a considerable concentration which increases compression and purification loads although it would ultimately be converted to butadiene and other products. Therefore, the butane recycle must be controlled. This is done by passing the overhead stream, 44, from fractionator S plus the by-pass stream, 41, through line 45 to fractionator E which separates n-butane from butene-1 in the first stage dehydrogenator effluent stream. Since this stream is largely butene-1, it may be fed in near the top of fractionator E serving mainly as additional reflux and not increasing the fractionator load appreciably. The recycle butene-1 thereby appears in the butene-1 stream from the first stage dehydrogenation while the recycle n-butane, in excess of the quantity allowed to pass overhead in fractionator E, is removed in absorber F overhead stream along with the unconverted n-butane from the first stem dehydrogenation.

The details of the first stage and second stage catalytic dehydrogenation, including catalysts used, temperatures, pressures, contact times, etc. are not given herein because they are now well within the skill of the art (see for example U. S. Patent to Wiezevich et al. 2,209,215) and because they constitute per se no part of the present invention.

*Examples*

As an example of the operation of my invention, a roughly stabilized C₄ mixture from the first step dehydrogenator B was charged to the lower feed entry of fractionator E through line 11. At the same time a C₄ mixture including the overhead product from fractionator S and the material in by-pass line 41 was charged to the upper feed entry of fractionator E through line 45. The compositions of streams 11 and 45 were:

| Component | Mol per cent | |
|---|---|---|
| | Stream 11 | Stream 45 |
| C₃ and lighter | 2.23 | 2.65 |
| Isobutane | Trace | Trace |
| Isobutylene | Trace | 3.81 |
| Butene-1 | 12.48 | 62.04 |
| Butadiene | Trace | 0.51 |
| N-butane | 60.33 | 6.92 |
| Butene-2 (low boiling) | 12.48 | 19.43 |
| Butene-2 (high boiling) | 12.48 | 4.64 |
| | 100.00 | 100.00 |

Fractionator E, a 100 tray bubble plate tower, was operated at a reflux ratio of 24.6:1 and a pressure of 170 p. s. i. a. Stream 11 and stream 45 entered the tower at tray 43 and tray 92 (numbered from the bottom), respectively. The tower top temperature was 171° F. and the reboiler temperature was 190° F. Under these operating conditions the overhead product, stream 13, was totally condensed and had the following composition:

| Component | Stream 13, mol per cent |
|---|---|
| C₃ and lighter | 7.86 |
| Isobutane | Trace |
| Isobutylene | 3.27 |
| Butene-1 | 83.10 |
| Butadiene | 0.37 |
| N-butane | 3.49 |
| Butene-2 (low boiling) | 1.71 |
| Butene-2 (high boiling) | 0.20 |
| | 100.00 |

The composition of the kettle product, stream 12, was:

| Component | Stream 12, mol per cent |
|---|---|
| Isobutylene | 0.03 |
| Butene-1 | 1.02 |
| Butadiene | 0.03 |
| N-butane | 64.52 |
| Butene-2 (low boiling) | 19.64 |
| Butene-2 (high boiling) | 14.76 |
| | 100.00 |

The bottom product from fractionator E was introduced into a 100 plate bubble tray absorber, F, through line 12, at the center of the column. Furfural, containing a small percentage of water and hydrocarbon, was introduced into absorber F near the top of the absorber through line 15. The ratio of the quantity of furfural introduced into the top of the tower to the quantity of hydrocarbon feed to the tower was about 9.4 gallons of furfural per gallon of hydrocarbon. The hydrocarbon reflux ratio was about 0.9:1. The average tower operating pressure was 75 pounds per square inch absolute, the top temperature was 110° F. and the bottom temperature was 285° F. The product withdrawn from the top of the column through line 2, and recycled to heater A, had the following composition:

| Component | Stream 2, mol per cent |
|---|---|
| Isobutylene | 0.03 |
| Butene-1 | 1.03 |
| Butadiene | .00 |
| N-butane | 97.01 |
| Butene-2 (low boiling) | 1.56 |
| Butene-2 (high boiling) | 0.37 |
| | 100.00 |

The composition of the product withdrawn from the bottom of absorber F through line 14 was as follows:

| Component | Stream 14, mol per cent |
|---|---|
| Isobutylene | Trace |
| Butene-1 | 0.03 |
| Butadiene | Trace |
| N-butane | 0.03 |
| Butene-2 (low boiling) | 1.69 |
| Butene-2 (high boiling) | 1.32 |
| Furfural (with a small percentage of water) | 96.93 |
| | 100.00 |

The rich furfural stream from the bottom of absorber F was introduced into stripper G, a 20 tray fractionator, through line 14. The stripper was operated with a reflux ratio of 6.7:1, average pressure of 65 pounds per square inch absolute, top temperature of 126° F. and bottom temperature of 302° F. Lean furfural containing a small percentage of water and about 0.1 per cent hydrocarbon was withdrawn from the bottom of the stripper through line 15 and recycled to absorber F. The stripper overhead product withdrawn through line 16, had a composition as follows:

| Component | Stream 16, mol per cent |
|---|---|
| Isobutylene | 0.05 |
| Butene-1 | 0.99 |
| Butadiene | 0.10 |
| N-butane | 0.89 |
| Butene-2 (low boiling) | 55.05 |
| Butene-2 (high boiling) | 42.92 |
| | 100.00 |

The overhead product from fractionator E, consisting principally of butene-1, and the overhead product from stripper G, consisting principally of butenes-2, were then combined in stream 17 and charged to the second stage dehydrogenation heater H and the second stage dehydrogenation unit I.

The above portion of an example of the operation of my invention has disclosed:

(1) The method and means whereby butene-1, n-butane and butenes-2 in the product from the first stage dehydrogenator are recovered separately by removing the butene-1 from the n-butane and butenes-2 in a conventional fractionator and then subjecting the n-butane-butenes-2 mixture to a selective solvent absorption step wherein the n-butane is separated from the butenes-2. The butene-1 from the fractionation step and the butenes-2 from the selective solvent step are subsequently combined and constitute a feed of suitable composition and purity for the second stage dehydrogenation step while the normal butane from the solvent step is of suitable purity and concentration for further processing as recycle stock to the first stage dehydrogenator.

(2) That fractionator E also serves to separate the butene-1 and n-butane from the second stage dehydrogenator (and thereby controls the recycle n-butane concentration to the second stage dehydrogenator) since essentially all of the n-butane and butene-1 in the second stage dehydrogenator effluent goes overhead in absorber N through line 32 and ultimately is introduced into fractionator E through line 45.

The effluent from dehydrogenator I was treated in units J and K in known manner to recover the butadiene-containing stream 27 and this stream was passed to fractionator L where the C₃'s and lighter were taken overhead. The bottoms product, stream 29, was fractionated in tower M to remove as bottoms, stream 31 containing C₅'s and heavier and a substantial portion of the butenes-2. The overhead consisting of all the rest of the C₄'s was extracted with furfural by means of absorber N and stripper O. A stream of the following composition was withdrawn overhead from absorber N, through line 32:

| Component | Stream 32, mol per cent |
| --- | --- |
| C₃'s | 2.64 |
| Isobutylene | 4.34 |
| Butene-1 | 61.69 |
| Butadiene | 0.50 |
| N-butane | 6.89 |
| Butene-2 (low boiling) | 19.33 |
| Butene-2 (high boiling) | 4.61 |
| | 100.00 |

This stream was split into two parts; one part representing about 25 per cent of stream 32 was charged to the selective polymerization unit R through line 40 while the remaining portion, representing about 75 per cent of stream 32 was by-passed around the polymerization unit through line 41.

Stream 40 was pumped through a heater (not shown, but part of unit R) wherein its temperature was raised to reaction level and was then passed over a silica-alumina, solid type polymerization catalyst which converted about one-half of the isobutylene to di-isobutylene. The actual quantity of isobutylene polymerized was about equivalent to the amount formed in the dehydrogenation reactions as previously explained. The paraffinic hydrocarbons in stream 40 passed through the catalyst unchanged. The olefinic hydrocarbons, other than isobutylene, also passed through the catalyst without undergoing appreciable polymerization, since the operating conditions on the catalyst were such to favor the selective polymerization of isobutylene. Stream 40 was passed over the catalyst at a space velocity of about 2 liquid volumes of hydrocarbon per volume of catalyst per hour. The temperature was about 200° F. and the pressure 400 pounds per square inch absolute. The effluent stream, 42, from the polymerization catalyst cases contained about 1.09 per cent polymer, which was mainly di-isobutylene. The isobutylene concentration in the effluent stream was 2.19 per cent.

Operating conditions on the catalytic polymerization cases may be varied according to the composition of stream 32 and the age of the catalyst. The effect of operating variables, such as composition, temperature, pressure, flow rate, age of catalyst, etc., on the conversion rate of isobutylene and normal butenes into polymers is well known to those skilled in the art and it is understood that in my invention the catalytic polymerization catalyst operating conditions will be adjusted to give the desired degree of conversion of isobutylene into polymer while minimizing the polymerization of normal butenes. Polymerization of the normal butenes is obviously undesirable; although these compounds will polymerize to an aviation base polymer in much the same manner as isobutylene, any loss of the normal butenes through polymerization reduces the yield of the primary product, butadiene.

The effluent stream from the polymerization catalyst cases was charged to a 15 tray fractionator S. This tower was operated at 80 pounds per square inch absolute pressure, 0.2:1 reflux ratio, tower top temperature of 121° F. and bottom temperature of 330° F. The polymer product withdrawn from the kettle through line 43 had a composition of 99 per cent polymer and 1 per cent C₄'s. Upon hydrogenation, the ASTM octane number of this polymer was 95 or greater. The overhead product from the tower, which was withdrawn through line 44, contained a negligible amount of polymer; except for a smaller quantity of isobutylene its composition was essentially the same as stream 32.

Streams 41 and 44 were combined into stream 45 and charged to fractionator E as previously explained.

Examples relating to the recovery of butadiene-1,3 from a complex hydrocarbon mixture such as contained in line 27 have been presented in my co-pending application, Serial No. 454,312. My present invention incorporates the separation processes disclosed in my co-pending application and, in addition, integrates those separations with the novel features and advantages of the recovery and separation steps disclosed herein.

As used herein and in the appended claims the term "normal butene" is intended to denote normal butenes unless the context requires otherwise. Likewise, the term "butene-2" includes both the low and high boiling isomers of butene-2 unless otherwise specified.

I claim:

1. A process for the manufacture of butadiene from normal butane which comprises catalytically dehydrogenating normal butane to normal butene in a first stage dehydrogenation, subjecting the C₄ hydrocarbon content of the resulting effluent to fractional distillation in a fractionator to remove the butene-1 content thereof as an overhead product from a bottoms product containing the n-butane and butene-2 content thereof, subjecting the resulting mixture of n-butane and butene-2 to extractive distillation with a solvent which dissolves butene-2 in preference to n-butane to selectively dissolve the butene-2 content thereof while allowing the n-butane content thereof to pass through undissolved and stripping the dissolved butene-2 from the rich solvent, recycling the overhead from said extractive distillation step and composed principally of n-butane to said first stage dehydrogenation, combining the butene-1 separated by said fractional distillation step with the butene-2 separated by said extractive distillation and stripping steps to give a second stage dehydrogenation feed, catalytically dehydrogenating said combined butene-1 and butene-2 to butadiene in a second stage dehydrogenation, and recovering butadiene from the effluent of said second stage dehydrogenation.

2. A process for the manufacture of butadiene from normal butane which comprises catalytically dehydrogenating normal butane to normal butene in a first stage dehydrogenation, subjecting the C₄ hydrocarbon content of the resulting effluent to fractional distillation in a fractionator to remove the butene-1 content thereof as an overhead product from a bottoms product containing the n-butane and butene-2 content thereof, subjecting the resulting mixture of n-butane and butene-2 to extractive disillation with a solvent which dissolves butene-2 in preference to n-butane to selectively dissolve the butene-2 content thereof while allowing the n-butane content thereof to pass through undissolved and stripping the dissolved butene-2 from the rich solvent, recycling the overhead from said extractive distillation step and composed principally of n-butane to said first stage dehydrogenation, combining the butene-1 separated by said fractional distillation step with the butene-2 separated by said extractive distillation and stripping steps to give a second stage dehydrogenation feed, catalytically dehydrogenating said combined butene-1 and butene-2 to butadiene in a second stage dehydrogenation, treating the effluent of said second stage dehydrogenation to recover therefrom a first fraction containing the isobutylene, butene-1 and n-butane content thereof and a second fraction containing the butadiene content thereof, treating at least a portion of said first fraction to selectively remove the isobutylene content thereof, and subjecting said first fraction thereby at least partially freed from isobutylene to fractional distillation in said fractionator along with said C₄ hydrocarbon content of the effluent from the first stage dehydrogenation.

3. A process for the manufacture of butadiene from normal butane which comprises catalytically dehydrogenating normal butane to normal butene in a first stage dehydrogenation, subjecting the C₄ hydrocarbon content of the resulting effluent to fractional distillation in a fractionator to remove the butene-1 content thereof as an overhead product from a bottoms product containing the n-butane and butene-2 content thereof, subjecting the resulting mixture of n-butane and butene-2 to extractive distillation with a solvent which dissolves butene-2 in preference to n-butane to selectively dissolve the butene-2 content thereof while allowing the n-butane content thereof to pass through undissolved and stripping the dissolved butene-2 from the rich solvent, recycling the overhead from said extractive distillation step and composed principally of n-butane to said first stage dehydrogenation, combining the butene-1 separated by said fractional distillation step with the butene-2 separated by said extractive distillation and stripping steps to give a second stage dehydrogenation feed, catalytically dehydrogenating said combined butene-1 and butene-2 to butadiene in a second stage dehydrogenation, treating the effluent of said second stage dehydrogenation to recover therefrom a first fraction containing the butene-1 and n-butane content thereof and a second fraction containing the butadiene content thereof, and subjecting said first fraction to fractional distillation in said fractionator along with said C₄ hydrocarbon content of the effluent from the first stage dehydrogenation.

4. A process for the manufacture of butadiene from normal butane which comprises catalytically dehydrogenating normal butane to normal butene in a first stage dehydrogenation, subjecting the C₄ hydrocarbon content of the resulting effluent to fractional distillation in a fractionator to remove the butene-1 content thereof as an overhead product from a bottoms product containing the n-butane and butene-2 content thereof, subjecting the resulting mixture of n-butane and butene-2 to extractive distillation with a solvent which dissolves butene-2 in preference to n-butane to selectively dissolve the butene-2 content thereof while allowing the n-butane content thereof to pass through undissolved and stripping the dissolved butene-2 from the rich solvent, recycling the overhead from said extractive distillation step and composed principally of n-butane to said first stage dehydrogenation, combining the butene-1 separated by said fractional distillation step with the butene-2 separated by said extractive distillation and stripping steps to give a second stage dehydrogenation feed, catalytically dehydrogenating said combined butene-1 and butene-2 to butadiene in a second stage dehydrogenation, treating the effluent from said second stage dehydrogenation to recover therefrom a first fraction containing the butene-1 and n-butane content thereof and some of the butene-2 content thereof and a second fraction containing the butadiene content thereof, and subjecting said first fraction to fractional distillation in said fractionator along with said C₄ hydrocarbon content of the effluent from the first stage dehydrogenation.

5. A process for the manufacture of butadiene from normal butane which comprises catalytically dehydrogenating normal butane to normal butene in a first stage dehydrogenation, subjecting the C₄ hydrocarbon content of the resulting effluent to fractional distillation in a fractionator to remove butene-1 from n-butane and butene-2, subjecting the resulting mixture of n-butane and butene-2 to selective solvent extraction to selectively dissolve the butene-2 and stripping the dissolved butene-2 from the rich solvent, combining the butene-1 separated by said fractional distillation step with the butene-2 separated by said solvent extraction and stripping steps to give a second stage dehydrogenation feed, catalytically dehydrogenating said combined butene-1 and butene-2 to butadiene in a second stage dehydrogenation, fractionally distilling that portion of the resulting effluent from the second stage dehydrogenation containing all of the C₄ hydrocarbon content thereof and some of the heavier than C₄ content to recover an overhead fraction containing substantially all of the isobutylene, butene-1, butadiene, and n-butane content and at least some of the butene-2 content and a bottoms fraction containing the heavier than C₄ content and the balance of the butene-2 content, subjecting said overhead fraction to selective solvent extraction to selectively dissolve a first fraction containing substantially all of the butadiene content thereof and some of the butene-2 content thereof and allow to pass through undissolved a second fraction containing the isobutylene, butene-1 and n-butane content thereof and the balance of the butene-2 content thereof, stripping said first fraction from the rich solvent, fractionally distilling said stripped first fraction to recover an overhead fraction of essentially pure butadiene and a bottoms fraction containing butene-2, combining said two bottoms fractions and fractionating the composite stream to recover overhead the butene-2 content thereof, merging the resulting butene-2 overhead fraction with said combined butene-1 and butane-2 feed to said second stage dehydrogenation step, selectively removing sufficient of the isobutylene content of said second fraction to prevent isobutylene from building up in the system to an objectionable extent, and passing the resulting stream of butene-1, n-butane and butene-2 from which isobutylene has been so removed into said first-named fractionator at a point therein above that at which said C₄ content of the effluent from the first stage dehydrogenation enters.

6. The process of claim 2 in which said isobutylene removal is accomplished by selective polymerization thereof without substantially affecting the normal butene content of said first fraction.

7. The process of claim 5 in which said isobutylene removal from said second fraction is effected by selective polymerization thereof without substantially affecting the normal butene content of said fraction.

8. The process of claim 1 in which the solvent used in said extractive distillation step is furfural.

9. The process of claim 5 in which the solvent used in both of said selective solvent extraction steps is furfural.

10. A process for the manufacture of butadiene from normal butane which comprises catalytically dehydrogenating normal butane to normal butenes in a first stage dehydrogenation, subjecting the C₄ hydrocarbon content of the resulting effluent to fractional distillation in a fractionator to remove butene-1 from n-butane and butene-2, subjecting the resulting mixture of n-butane and butene-2 to selective solvent extraction to selectively dissolve the butene-2 and stripping the dissolved butene-2 from the rich solvent, combining the butene-1 separated by said fractional distillation step with the butene-2 separated by said solvent extraction and stripping steps to give a second stage dehydrogenation feed, catalytically dehydrogenating said combined butene-1 and butene-2 to butadiene in a second stage dehydrogenation, fractionally distilling that portion of the resulting effluent from the second stage dehydrogenation containing all of the C₄ hydrocarbon content thereof and some of the heavier than C₄ content to recover an overhead fraction containing substantially all of the butene-1, butadiene and n-butane content and at least some of the butene-2 content and a bottoms fraction containing the heavier than C₄ content and the balance of the butene-2 content, subjecting said overhead fraction to selective solvent extraction to selectively dissolve a first fraction containing substantially all of the butadiene content thereof and some of the butene-2 content thereof and allow to pass through undissolved a second fraction containing the butene-1 and n-butane content thereof and the balance of the butene-2 content thereof, stripping said first fraction from the rich solvent, fractionally distilling said stripped first fraction to recover an overhead fraction of essentially pure butadiene and a bottoms fraction containing butene-2, combining said two bottoms fractions and fractionating the composite stream to recover overhead the butene-2 content thereof, merging the resulting butene-2 overhead fraction with said combined butene-1 and butene-2 feed to said second stage dehydrogenation step, and subjecting said second fraction to fractional distillation in said first named fractionator along said C₄ hydrocarbon content of the effluent from the first stage dehydrogenation.

11. A process for the manufacture of butadiene from normal butane which comprises catalytically dehydrogenating normal butane to normal butene in a first stage dehydrogenation, subjecting the C₄ hydrocarbon content of the resulting effluent to fractional distillation in a fractionator to remove the butene-1 content thereof as an overhead product from a bottoms product containing the n-butane and butene-2 content thereof, subjecting the resulting mixture of n-butane and butene-2 to extractive distillation with a solvent which dissolves butene-2 in preference to n-butane to selectively dissolve the butene-2 content thereof while allowing the n-butane content thereof to pass through undissolved and stripping the dissolved butene-2 from the rich solvent, recycling the overhead from said extractive distillation step and composed principally of n-butane to said first stage dehydrogenation, combining the butene-1 separated by said fractional distillation step with the butene-2 separated by said extractive distillation and stripping steps to give a second stage dehydrogenation feed, catalytically dehydrogenating said combined butene-1 and butene-2 to butadiene in a second stage dehydrogenation, treating the effluent of said second stage dehydrogenation to recover therefrom a first fraction containing the butene-1 and n-butane content thereof and a second fraction containing the butadiene content thereof, separately recovering the normal butane and butene-1 content of said first fraction, recycling said normal butane content to said first stage dehydrogenation, and recycling said butene-1 content to said second stage dehydrogenation.

KARL H. HACHMUTH.